United States Patent Office 3,365,402
Patented Jan. 23, 1968

3,365,402
PROCESS FOR ELIMINATING THE HARMFUL EFFECTS OF AN ALKALINE CATALYST IN CAPILLARY-ACTIVE PRODUCTS
Jacobus Adrianus Brenkman, Gouda, and Johan G. Aalbers, Bodegraven, Netherlands, assignors to Chem-Y, Fabriek van Chemische Produkten N.V., Bodegraven, Netherlands
No Drawing. Filed Feb. 25, 1964, Ser. No. 347,122
Claims priority, application Germany, Feb. 27, 1963, N 22,812
5 Claims. (Cl. 252—356)

ABSTRACT OF THE DISCLOSURE

A process for eliminating the harmful effects of an alkaline catalyst in a capillary-active product comprising at least one polyether derivative of the formula (I)  $\qquad$ $R\text{—}O\text{—}(C_mH_{2m}O)_nH$ or (II)  $\qquad$ $R'\text{—}CO\text{—}O\text{—}(C_mH_{2m}O)_nH$ and mixtures thereof, in which R represents a hydrocarbon residue having from 8 to 20 carbon atoms, R' represents a hydrocarbon residue having from 7 to 19 carbon atoms, $m$ is an integer having a value from 2 to 4, and $n$ is a number having an average value from 1 to 50, including compounds of Formulae (I) and (II) containing various groups $(C_mH_{2m}O)$ in a single molecule, wherein said capillary-active product is treated with an equivalent proportion, based on said alkaline catalyst present in said product, of at least one acid of the general formula (V)  $\qquad$ $R\text{—}O\text{—}(C_mH_{2m}O)_xR''\text{—}COOH$ In which R and $m$ have the meanings stated above, $x$ is a number having an average value of from 1 to 50 and R" is an alkylene residue having from 1 to 3 carbon atoms.

The invention includes the products so made. This class of products is used on a vast scale for various purposes, some of the most important being that of emulsifiers and solubilizers.

---

Capillary-active products of the general formulae (I)  $\qquad$ $R\text{—}O\text{—}(C_mH_{2m}O)_nH$ and (II)  $\qquad$ $R'\text{—}CO\text{—}O\text{—}(C_mH_{2m}O)_nH$ are generally known. In the above formulae, the symbols for R, R', $m$ and $n$ are the ones indicated above. Capillary-active products of Formulae (I) and (II) have been disclosed in United States Patent 1,970,578 and as intermediates in United States Patent 2,183,853, United States Patent 3,054,820 and published German patent application 1,117,879.

The above products are generally prepared by reacting a compound chosen from the group consisting of alcohols and carboxylic acids, corresponding to the formula (III)  $R\text{—}OH$ and (IV)  $R'\text{—}CO\text{—}OH$ respectively (R and R' having the above meanings) with at least one epoxyalkane in the presence of a catalyst. In this process an alkaline compound, particularly NaOH, is often used as the catalyst. Consequently the so obtained product contains a small amount, substantially 0.5–0.2%, of the catalyst, and as said product has the form of a paste or a highly viscous liquid, this impurity cannot be removed in a simple way.

The presence of this small amount of alkaline material causes several disadvantages, particularly the following:

(1) The presence of the alkaline material makes the product much more sensitive towards oxygen from the air, so that a gradual discoloration occurs. Thus, a layer of brown material is formed on the walls of the container in which the product is shipped to the users, and accordingly the product becomes partially unfit for use.

(2) Part of the alkaline material reacts with the main product to form the corresponding polyglycol-alcoholate; however the greater part of the alkaline material reacts with carbon dioxide from the air to form a carbonate, and it is well known, that the emulsifying action is impaired by the presence of such salts.

(3) The product as a whole shows a slightly alkaline reaction and accordingly cannot be used in combination with alkali-sensitive products.

In order to overcome the above disadvantages, it has already been proposed to remove the catalyst from the product. To this end it has been proposed in United States Patents 2,983,763 and 3,000,963 to treat the product with phosphoric, acetic, carbonic, sulfuric, citric, oxalic, succinic, benzoic, of phthalic acid, followed by filtration of the formed salt. This filtration is essential, because otherwise salts would remain in the product and impair its emulsifying action, whilst moreover the product in that case would not be entirely homogeneous. Furthermore it has been proposed in British Patent 857,434 to treat the product with an ion-exchanger, and of course this should also be followed by filtration. However, it is exactly such a filtration which renders this sort of processes uneconomical and difficult to carry out. As has been mentioned already, the products have the consistency of pastes or of highly viscous liquids, and for that reason they cannot be filtered in this state.

Accordingly, they have to be heated, which in itself means an uneconomical waste of energy. Subsequently they have to be filtered while hot, but even then they are still viscous liquids which can only be filtered with great difficulty. Therefore such processes cannot be carried out on a commercial scale.

Accordingly there is an urgent need for a method of removing the alkalinity of the above described products, without having to deal with the difficulties of the known methods.

According to the invention it has now been found that all of the abovementioned difficulties can be avoided by converting the alkaline catalyst into capillary-active compounds which are compatible with the main product and accordingly can remain therein without impairing its favorable properties.

According to this invention, the product containing the catalyst is treated with an equivalent amount (based on the catalyst) of an acid having the general formula (V)  $\qquad$ $R\text{—}O\text{—}(C_mH_{2m}O)_xR''\text{—}COOH$ in which R and $m$ have the meanings stated hereinabove, $x$ is a number having an average value of 1 to 50 and R" is an alkylene residue having 1 to 3 carbon atoms. Thus, novel products are obtained, which besides the polyether derivatives mentioned already, contain alkali metal salts of the just mentioned carboxylic acids. The proportion of these salts depends on the proportion of the original catalyst, and on the molecular weight or average molecular weight of the added acid or mixture of acids. In general the proportion of these salts will be about 0.3 to about 3% by weight of the final product.

Acids of the above Formula (V) are well known in the art, e.g. from United States Patent 2,183,853.

Advantageously one uses a carboxylic acid (or mixture of such acids) having a content (or average content) of oxyethylene units corresponding to that of the main product, since in this way products having somewhat better emulsifying properties are obtained.

The process of this invention makes it possible to completely eliminate the harmful effects of the catalyst without having to separate the catalyst from the product. It has appeared that the products of this invention do not discolor, possess excellent capillary-active properties, and are quite homogeneous. This last mentioned property is probably due to the similarity in constitution between the additive and the main product. In this respect it should be remarked that experiments have shown that the desired result is not obtained, when the product containing the catalyst is treated with stearic acid in an amount equivalent to the catalyst, although the stearic salts also show a certain capillary-active action. In that case the obtained product is not homogeneous.

It should further be remarked that acid polyether sulfates having the formula (VI) $R-O-(C_mH_{2m}O)_xSO_3H$ in which the several symbols have the meanings stated above, neither enter into consideration for the present purpose. These acid sulfates are obtained by sulfatation of the corresponding ether-alcoholates, and in this sulfatation some inorganic acid as always formed, which would give rise to the forming of undesirable salts in the final product. Moreover such an acid polyether sulfate should always be used in a freshly prepared state, and this would lead to difficulties in commercial use for the present purpose.

The invention is further elucidated by the following examples, without being limited thereto.

Example 1

In an autoclave 270 grams (1 mole) of oleyl alcohol are reacted in the known way with 396 grams (9 moles) of epoxyethane in the presence of 0.34 gram (0.0085 mole) of caustic soda.

After completion of the reaction about 4 grams of a technical grade of laurylpolyoxyethylene acetic acid having the Formula $C_{12}H_{25}O-(C_2H_4O)_{2.5}CH_2COOH$ are added. The acid number of this technical grade product is 2,1 milliequivalents/gram so that 4.04 grams of this product are necessary in order to exactly neutralize the amount of catalyst present in the product.

The emulsifier so obtained does not show any brown discoloration on storage, when the product is used for preparing emulsions, it appears that the addition of the laurylpolyoxyethylene acetic acid does not have any disadvantageous effect on the obtained emulsions.

When, on the other hand, the emulsifier obtained according to the first paragraph of this example is neutralized with about 2.8 grams of phosphoric acid, the emulsifier loses its waxy character, whilst furthermore the emulsions prepared therewith are much thinner and show a tendency to breaking.

Example 2

The product obtained according to the first paragraph of Example 1 is neutralized with 4.6 grams of a technical grade acid having the Formula $C_{12}H_{25}O-(C_2H_4O)_{4.6}CH_2COOH$ and having an acid number of 1.85 milliequivalent/gram. The same good general results are obtained as in Example 1, but the solubility of the present product is somewhat less.

Example 3

70 grams (0.292 mole) of nonylphenol are treated with 90 grams (2.05 moles) of epoxyethane in the presence of 0.1 gram (0.0025 mole) of caustic soda. An adduct of nonylphenol with 7 moles of epoxyethane is so obtained.

After completion of the reaction there are added 2 grams of a technical grade of p-octylphenoxypolyethoxy acetic acid of the Formula $p-C_8H_{17}-C_6H_4O(C_2H_4O)_6CH_2COOH$ This product has an acid number of 1.3 milliequivalents/gram.

By the addition of this acid a product is obtained which does not discolor anymore, whilst the emulsifying action has not been influenced in any way.

Example 4

The process of Example 3 is followed with this exception that the 2 grams of the acid used therein are replaced by 1.2 grams of an acid having the Formula $C_{12}H_{25}O-(C_2H_4O)_{2.5}CH_2COOH$ The same results as in Example 3 are obtained.

Example 5

(a) In the presence of 0.22 gram (0.0055 mole) of caustic soda, 220 grams (1.1 moles) of lauryl alcohol (technical grade) are treated with 100 grams (2.28 moles) of epoxyethane. An adduct of lauryl alcohol with 2.1 moles of epoxyethane is so obtained. This adduct is a liquid product which on standing develops a strongly alkaline precipitate.

(b) The procedure of part (a) is followed, but after completion of the reaction one adds 2.6 grams of an acid having the Formula $C_{12}H_{25}O-(C_2H_4O)_xCH_2COOH$ in which $x=2.5$. In this case a product is obtained which does not show anymore a tendency of forming an alkaline precipitate. The emulsifying action is not impaired in any respect by this addition.

(c) The procedure of part (b) is followed, but with replacement of the abovementioned acid by an acid of the same general formula in which, however, $x=4.6$. Substantially the same results are obtained.

Example 6

An adduct of lauryl alcohol with 2.1 moles of epoxyethane is prepared in the same way as described in Example 5 (a). 3.9 grams of the same p-octylphenoxypolyethoxy acetic acid as used in Example 3 are added to this adduct. Substantially the same results as in parts (b) and (c) of Example 5 are obtained. The product of this example only differs from that of Example 3 in that the present product is somewhat less viscous.

Example 7

(a) 56 grams (0.208 mole) of stearic acid are reacted with 104 grams (2.36 moles) of epoxyethane in the presence of 0.3 gram (0.0075 mole) of caustic soda. The so obtained adduct has an average content of 12 ethoxy groups on each stearic acid residue. This adduct discolors on standing.

(b) The same procedure as in part (a) is followed, but in this case 4.7 grams of an acid having the Formula $C_{18}H_{37}O-(C_2H_4O)_2CH_2COOH$ are added to the adduct. In this way a product is obtained which does not discolor, even on prolonged standing, whilst the emulsifying properties are not impaired in any way.

The same results are obtained, when the abovementioned acid is replaced by 3.6 grams of an acid of the Formula $C_{12}H_{25}O-(C_2H_4O)_{2.5}CH_2COOH$.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What we claim is:

1. A process for eliminating the harmful effects of an alkaline catalyst in a capillary-active product comprising at least one compound chosen from the group consisting of polyether derivatives of the formulae (I) $R-O-(C_mH_{2m}O)_nH$ and (II) $R'—CO—(C_mH_{2m}O)_nH$ and mixtures thereof, in which R represents a hydrocarbon residue having from 8 to 20 carbon atoms, R' represents a hydrocarbon residue having from 7 to 19 carbon atoms, $m$ is an integer having a value from 2 to 4, and $n$ is a number having an average value from 1 to 50, including compounds of Formulae (I) and (II) containing various groups $(C_mH_{2m}O)$ in a single molecule, characterized by the fact that said capillary-active product is treated with an equivalent proportion, based on said alkaline catalyst present in said product, of at least one acid of the general formula (V) $R—O—(C_mH_{2m}O)_xR''—COOH$ in which R and $m$ have the meanings stated above, $x$ is a number having an average value of from 1 to 50 and R'' is an alkylene residue having from 1 to 3 carbon atoms.

2. A process as claimed in claim 1, wherein an acid of Formula (V) of claim 1 is used, in which the value of "$x$" corresponds to the value of "$n$" in the product chosen from the group consisting of compounds of Formula (I), Formula (II), and mixtures thereof.

3. A capillary-active product, mainly comprising at least one compound chosen from the group consisting of compounds of the formulae (I) $R—O—(C_mH_{2m}O)_nH$ and (II) $R'—CO—O—(C_mH_{2m}O)_nH$ and mixtures thereof, in which the several symbols have the meanings stated in claim 1, characterized by the presence of a minor proportion of an alkali metal salt of at least one acid having the general formula (V) $R—O—(C_mH_{2m}O)_xR''—COOH$ in which the various symbols have the meanings stated in claim 1.

4. The product of claim 3, wherein the proportion of said alkali metal salt is about 0.3 to about 3.0% by weight of the product.

5. The product of claim 3, wherein the value of "$x$" in said salt corresponds to the value of "$n$" in the polyether derivative chosen from the group consisting of compounds of Formula (I), compounds of Formula (II), and mixtures thereof.

References Cited

UNITED STATES PATENTS

| | | | |
|---|---|---|---|
| 1,970,578 | 8/1934 | Schoeller et al. | 260—410.6 |
| 2,183,853 | 12/1939 | Hanssmann et al. | 260—535 |

HENRY R. JILES, *Primary Examiner.*